Aug. 23, 1938.  H. EPSTEIN  2,128,041
METAL REINFORCEMENT FOR SUSPENDERS
Filed Jan. 7, 1937
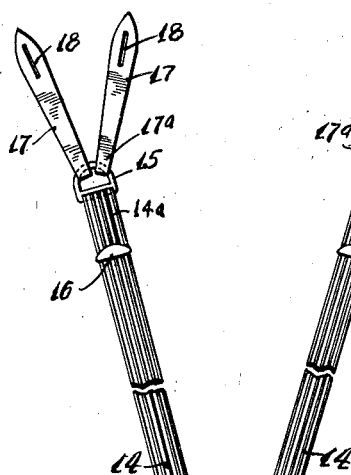
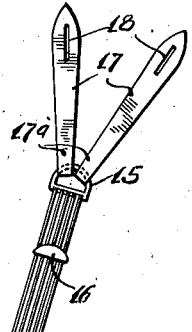
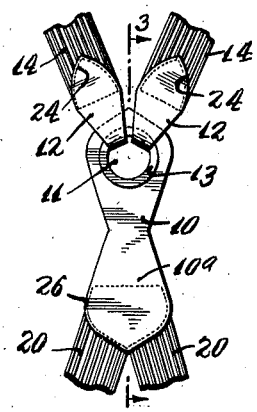
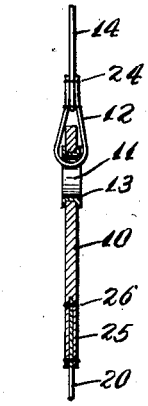
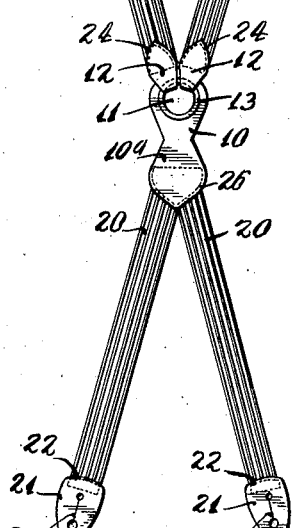
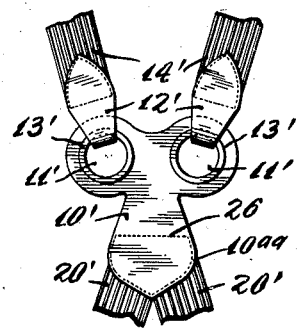
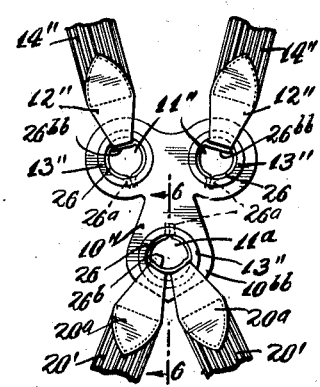
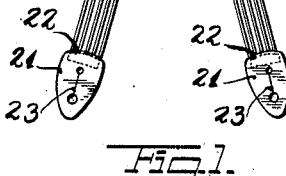
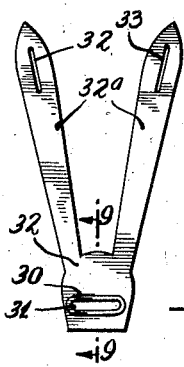
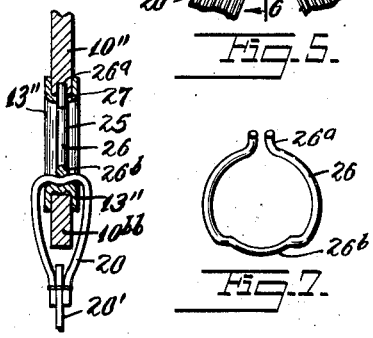
INVENTOR
HYMAN EPSTEIN
BY
ATTORNEY Patented Aug. 23, 1938

2,128,041

UNITED STATES PATENT OFFICE 2,128,041

METAL REINFORCEMENT FOR SUSPENDERS

Hyman Epstein, Brooklyn, N. Y.

Application January 7, 1937, Serial No. 119,397

1 Claim. (Cl. 241—19)

This invention relates to new and useful improvements in a metal reinforcement for suspenders.

The invention has for an object the construction of a metal reinforcement for suspenders which is characterized by a leather connecting member having an opening for receiving strap support elements of the straps of the suspenders, and an eyelet member clamped on the edge of said opening.

Furthermore, the invention proposes an arrangement in which the leather connecting member is provided with a lug portion projection on one side, to which strap portions of the suspenders are secured, preferably with stitches.

Still further the invention contemplates a modification in which the leather connecting member is provided with more than one opening and each of the openings are protected with an eyelet member clamped on the edges thereof.

Still further the invention proposes to incorporate the feature of the eyelet member, and the straps normally located on the ends of the shoulder straps and back straps of a pair of suspenders.

Furthermore, the invention also contemplates the provision of a wire engaging within a groove in the inner diameter of each of the eyelet members and arranged in a particular manner so as to hold the strap support elements in fixed positions.

For further comprehension of the invention, and of the objects and advantages thereof, reference will be had to the following description and accompanying drawing, and to the appended claim in which the various novel features of the invention are more particularly set forth.

In the accompanying drawing forming a material part of this disclosure:—

Fig. 1 is an elevational view of a pair of suspenders constructed according to this invention.

Fig. 2 is an enlarged detailed view of a portion of Fig. 1.

Fig. 3 is a transverse sectional view taken on the line 3—3 of Fig. 2.

Fig. 4 is a view similar to Fig. 2 but illustrating a modification.

Fig. 5 is another view similar to Fig. 2 but illustrating a still further modified form of the invention.

Fig. 6 is a sectional view taken on the line 6—6 of Fig. 5.

Fig. 7 is a perspective view of the eyelet holding element used in Figs. 5 and 6.

Fig. 8 is an elevational view of one of the end straps of a pair of suspenders constructed according to this invention.

Fig. 9 is a sectional view taken on the line 9—9 of Fig. 8.

The metal reinforcement for suspenders, according to this invention, is shown applied to a pair of suspenders illustrated in Fig. 1. These suspenders comprise a leather connecting member 10 having an opening 11 for receiving strap support elements 12. This opening 11 has an eyelet member 13 clamped upon the edge thereof. The strap support elements 12 are connected with shoulder straps 14. Each of these shoulder straps has a ring member 15 mounted upon its extremity through which a section 14ª of the shoulder strap passes and which section is associated with a holding clamp 16 by which the overall length of the shoulder strap may be adjusted. The ring 15 also supports a pair of button connecting elements 17. These elements have bent ends 17ª engaged through the ring 15. The outer ends of these elements are provided with buttonholes 18.

The leather connecting member 10 has an offset lug portion 10ª to which back straps 20 for the suspenders are attached. The extremities of these back straps are provided with button elements 21.

Each button element 21 comprises a piece of leather secured to the end of the strap 20 by stitches 22 and each of the end pieces 21 has a button hole 23 formed in it.

The strap supporting elements 12 comprise pieces of leather looped through the eyelet member 13 and secured by stitches 24 to the inner ends of the straps 14. The lug portion projection 10ª is formed with a slit 25 into which the ends of the back straps 20 engage. Stitches 26 then pass through these parts for holding the back strap in position.

The main feature of this invention resides in the fact that the opening 11 of the leather connecting member 10 is reinforced by the large eyelet member 13. This arrangement permits the strap supporting elements 12 to slide to their correct positions when the suspender is being used. At the same time the eyelet member serves to reinforce the leather connecting member 10 so that it maintains its shape during use. Furthermore, the life of the leather connecting member is lengthened as the opening in it is reinforced.

In Fig. 4 a modification of the invention has been disclosed in which there is a leather connecting element 10' formed with a pair of openings 11', each one of which is reinforced with an eyelet member 13'. These openings 11' are located on a horizontal line and spaced from each other. The strap support element 12' from the back straps 14' engage selectively through the eyelet members 13'. The leather connecting member 10' has an offset lug projecting portion 10aa to which the back straps 20' are attached by stitches 26'.

In Figs. 5–7 inclusive, another modified form of the invention has been disclosed in which there is a leather connecting member 10" formed with a pair of spaced openings 11" for the shoulder straps 14". This member 10" is also formed with a lug projection portion 10bb which has an opening 11a for strap support elements 20a from the back straps 20".

The shoulder straps 14" are provided with strap support elements 12" looped through the openings 11" and secured in position by suitable stitches. The openings 11" and 11a are reinforced with eyelet members 13" clamped upon the edges thereof. Each of these eyelets are formed with a groove 25 in the inner diameter thereof. An annular piece of wire 26 is bent from a strip of wire and has its ends 26a extended radially and engaging through an opening 27 in the eyelet member for maintaining the annular member 26 against turning. Each annular member 26 has an offset portion 26b adapted to encase the strap supporting element engaged through the eyelet member.

Each annular wire 26 maintains its position because of its inherent resiliency, tending to expand. It may be removed by forcing the projecting ends 26a out from the openings 27 and then removing the annular wire. When the annular wire is removed the strap support elements are free and may move along the eyelet member. A feature of the annular wire is that it holds the strap support element or elements from shifting and thus from undue rubbing and strain.

In Figs. 8 and 9 another embodiment of the invention has been disclosed in which an eyelet member 30 is associated with an opening 31 formed in a button strap 32 of a pair of suspenders. This button strap 32 has a pair of fingers 32a formed with buttonholes 33. The opening 31 is of elongated shape and the eyelet 30 is of corresponding shape and form. Through this elongated eyelet 31 the conventional shoulder strap of a pair of suspenders may pass so that the shoulder strap may be adjusted as to length by a conventional adjustment fold and buckle.

While I have illustrated and described the preferred embodiments of my invention, it is to be understood that I do not limit myself to the precise constructions herein disclosed and the right is reserved to all changes and modifications coming within the scope of the invention as defined in the appended claim.

Having thus described my invention, what I claim as new, and desire to secure by United States Letters Patent is:—

A metal reinforcement for suspenders comprising a leather connecting member having an opening for receiving strap support elements, an eyelet member clamped on the edge of said opening, said eyelet member having a groove formed on its inner diameter, and an annular wire extended along said groove and having radially projecting end portions engaging into an opening in the eyelet member to hold the annular wire from turning, and said annular wire having an offset portion for engaging over said strap support elements to hold the elements from shifting in the eyelet member.

HYMAN EPSTEIN.